United States Patent [19]
Amberg et al.

[11] 3,839,117
[45] Oct. 1, 1974

[54] METHOD OF MAKING A PLASTIC-COVERED GLASS CONTAINER

[75] Inventors: Stephen W. Amberg, St. James; Thomas E. Doherty, Setauket; James A. Karabedian, Garden City, all of N.Y.; Clarence A. Heyne, Sun City, Ariz.

[73] Assignee: Owens-Illinois, Inc., Toledo, Ohio

[22] Filed: Mar. 29, 1973

[21] Appl. No.: 345,900

Related U.S. Application Data

[62] Division of Ser. No. 158,480, June 30, 1971, Pat. No. 3,767,496.

[52] U.S. Cl............... 156/218, 156/229, 156/244, 156/277, 156/456, 156/497
[51] Int. Cl............................................. B29d 23/10
[58] Field of Search .......... 156/447, 456, 458, 497, 156/212, 215, 218, 86, 191, 184, 244, 277, 229; 162/188; 72/48

[56] References Cited
UNITED STATES PATENTS
3,235,433   2/1966   Cuacho et al...................... 156/447
3,510,378   5/1970   Kramer............................. 156/218

Primary Examiner—Charles E. Van Horn
Assistant Examiner—J. Massie
Attorney, Agent, or Firm—J. R. Nelson

[57] ABSTRACT

The disclosure relates to a method of making a container comprised of a glass bottle and a plastic covering thereon. The plastic is processed into sheet form and highly oriented for shrink property along one dimension. A minor orientation (one-half or less) is provided in the other dimension. The sheet is pre-printed and formed into strips fed to a mandrel-type machine for making individual, lap-seamed, cylindrical sleeves of the plastic, the major shrink orientation being oriented circumferentially of the sleeve. The sleeves are telescopically located to a predetermined height on a rigid base article, a bottle that has been preheated to around 220°F and the sleeve and bottle carried into an oven for shrinking the plastic onto the bottle. Differential surface skin is provided in the plastic, the greater depth skin being placed next to the bottle. Bottle heat is furnished either: (1) by an auxiliary preheat oven, or (2) by heat of formation of the container in its manufacture, such as obtained in the annealing lehr. The initial placement of the sleeve allows a bottom end overlap of the sleeve on the bottle and shrinking the plastic results in covering the bottle at least along its body, bottom corner and onto the bottom end at an annular bearing surface thereon.

5 Claims, 21 Drawing Figures

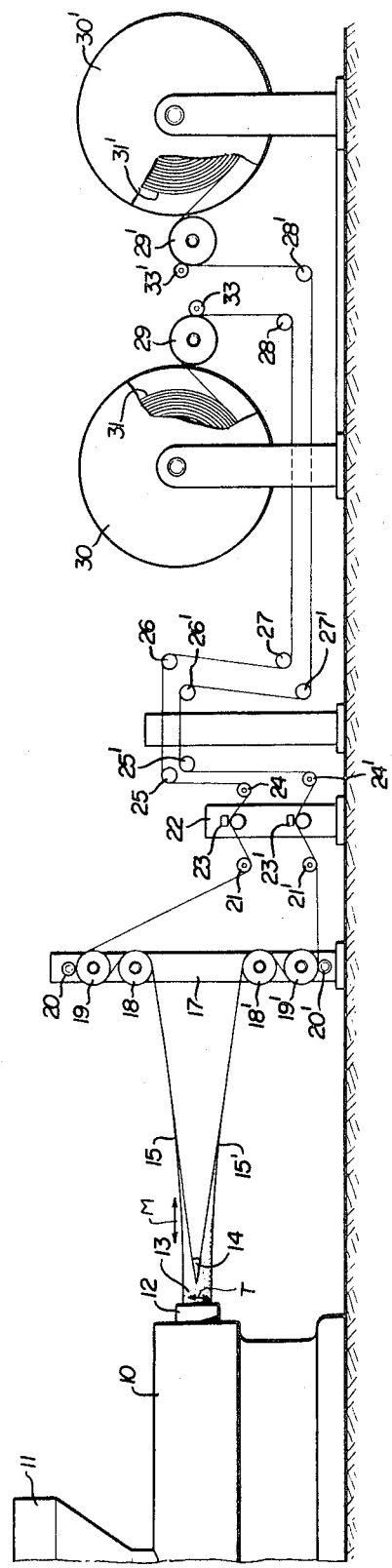
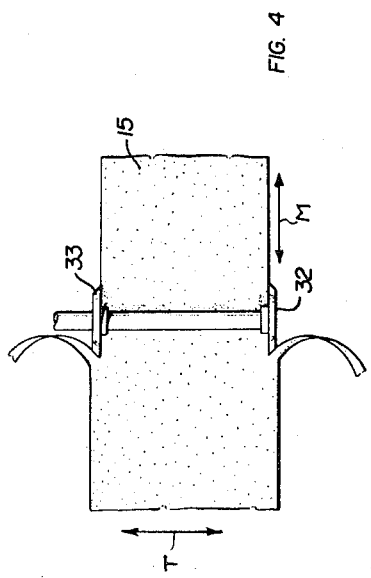
FIG. 3
FIG. 4

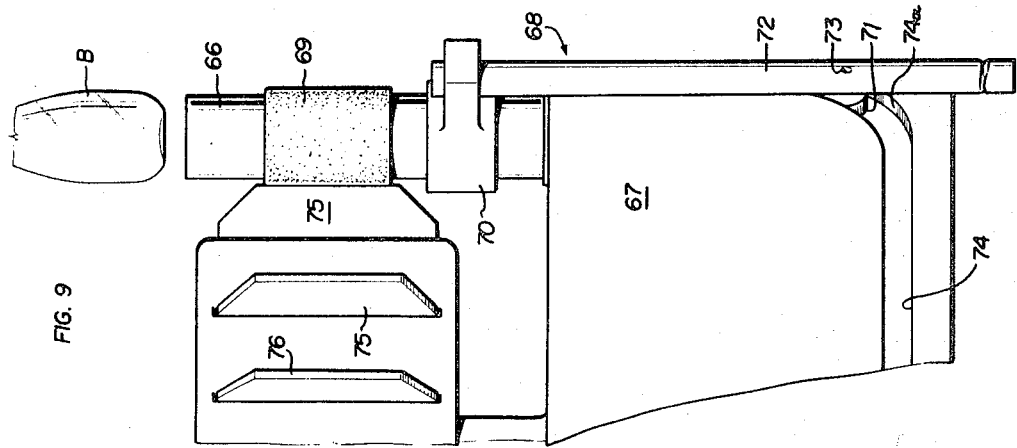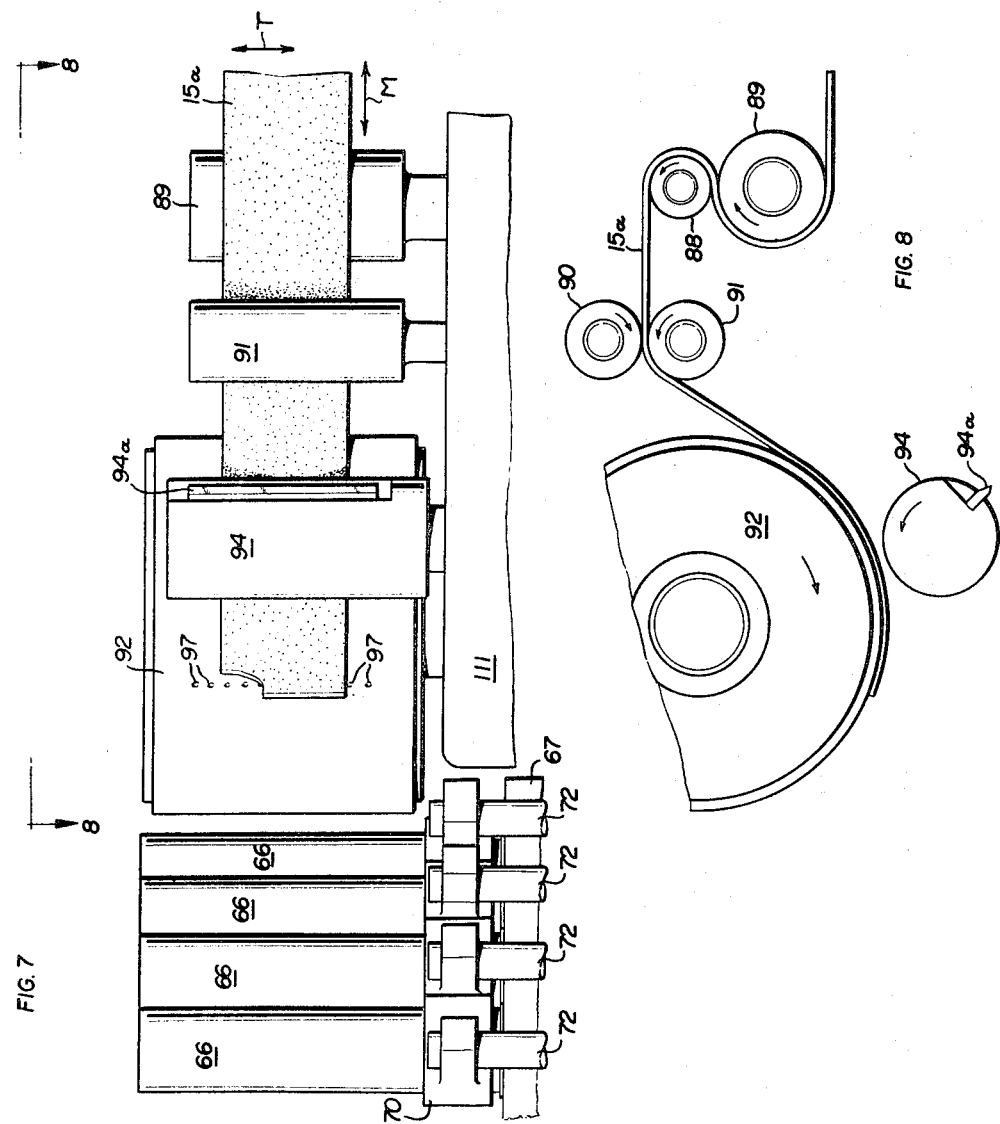

METHOD OF MAKING A PLASTIC-COVERED GLASS CONTAINER

This application is a divisional of my co-pending application Ser. No. 158,480, filed June 30, 1971 and now U.S. Pat. No. 3,767,496.

METHOD OF MAKING A PLASTIC-COVERED GLASS CONTAINER

The present invention relates to a method of making a plastic covered container including the process for making a preformed shrinkable thermoplastic sleeve that is placed over a thermally preconditioned bottle and shrunken to form a bottle coating over the glass surface most susceptible to damage or abuse. The invention also provides the advantage of improved decorating and labelling for the bottle in that the plastic may be more conveniently and economically printed to high quality while in a flat sheet.

BACKGROUND OF THE INVENTION

In the manufacture of glass containers, it is important to preserve in as practical a manner as possible the pristine strength and condition of the outer glass surface of the bottle. Various methods have been practiced, among which are application of sprayed or dip coatings of metal oxides, polymers, plastics and the like. A more recent innovation is the application of snug-fitting coverings or wrapping on the surface of the bottle or the application of pre-formed fitments that house the major diameter portions of the bottle and prevent side-to-side wall contact.

SUMMARY OF THE INVENTION

In the present invention, a practical method is devised for applying a sheath or sleeve covering over desired surface portions of the bottle that provides the following advantages:

1. The material for the sheath may be one of a variety of thermoplastics capable of being highly oriented and upon thermal treatment shrunken to the shape of the base article, i.e., a bottle.
2. The oriented plastic is handled in sheet form and may be conveniently printed by a variety of quality printing methods to provide attractive and economical labelling or decoration on the bottle.
3. Once printed and slit to size, the plastic web is fed into a device for cutting predetermined lengths from a roll supply of the material and wrapping each length on a mandrel to form a seamed cylinder of the plastic by an automated and continuous process.
4. The formed cylinder-sleeve is moved in axial registry with a bottle and telescopically moved over the surface area of the bottle desired for coverage, whereupon the sleeve and bottle are subjected to thermal treatment to shrink the sleeve into snug, conforming fit on the bottle surface area desired to be covered.

An important feature in the process resides in the pre-conditioning of the bottle thermally to enhance proper shrinkage of the sleeve over the bottle. By placing the sleeve on the bottle such that a portion of the sleeve extends beyond the one end of the bottle, normally the bottom end of the bottle, the resulting shrink-fit of the sleeve provides a conforming covering for the heel or corner radius of the bottle and an adjacent annular bottom end section, herein called the bearing ring surface, to cushion the bottom end of the bottle on the supporting surface thereof. This also insulates or separates the glass from contact with the supporting surface so that, in effect, the plastic covering serves as a coaster and avoids marring of furniture, etc.

Although the process herein disclosed is practical for application of sheet or film of shrinkable thermoplastic, the preferred material comprises a pre-foamed or cellular thermoplastic which provides a light weight, economical cushion layer on the glass wall surfaces and avoids other packing protection, such as carton partitions. Moreover, inasmuch as some bottled products receive harmful effects from light radiation, the invention also allows protection of product in the container against harmful radiation by the sleeve or sleeve and carrier wrap in packaging the product for market.

In providing the foregoing, the invention includes the following important features:

Forming a sheet or web of thermoplastic material, which optionally may be foamed, and imparting to the sheet a predetermined amount of orientation. The material is oriented in the machine (longitudinal) direction a greater extent than in the cross (transverse) direction. Machine direction orientation should be at least twice the cross direction orientation.

A skin is formed on the foamed plastic material as it is extruded. This is controlled by the cooling of the material as it issues from the extruder die. The skin is on the opposite surfaces of the foamed plastic and the skin surface that is ultimately intended to be next to the glass bottle surface should be thicker than the outside surface skin. This thickness relationship of inside to outside skin should be at least 1.2 to 1 or more.

Processing the sheet through the suitable printing or decorating in printing press equipment and drying or curing equipment.

Slicing the sheet in predetermined widths for the plastic sleeves and rolling the widths on rolls.

Feeding the rolls as a continuous web or strip to a sleeve forming device in which indicia on the web registers the printing for cutting the lengths of the sleeve blanks in making a sleeve with the image decoration thereon.

Cutting and feeding successively individual lengths of the plastic as blanks onto mandrels of a continuously operating turret machine that wraps the blank around the mandrel and overlaps the forward and aft ends of the blank.

Ironing the overlapped ends of the blank into a heat-seal seam of approximately the thickness of the blank stock (especially true of the foamed material) by a heated, iron-type seamer.

Loading glass bottles onto a continuous conveyor by timing a continuous line of bottles with a series of overhead chucks which pick up the glass bottles and advance them toward the mandrel-turret machine.

Moving the series of bottles in an indexed arcuate path over the rotary turret machine whereat the sleeves are axially moved from the mandrels over the bottles in an end-overlap, telescopic relation. The glass bottles, as they receive the plastic sleeves, are at an elevated temperature.

Moving the bottles and sleeves thereon away from the rotary turret machine and into a heat tunnel maintaining an atmosphere of heated air sufficient to shrink the plastic sleeve over the bottle in a snug conforming fit.

Unloading the sheath covered bottles onto a firm surface, such as a conveyor, with a firm downward thrust or bump, thereby stabilizing the end bearing surface of the sheath at or around the coaster ring portion. It should be noted that the axial seam of the sleeve will appear across the annulus of the final sheath on the bottom end of the bottle, and this unloading step of bumping or force application on the bottom will smooth out any such irregularity of surface occurring in this annulus region in the bearing ring surface and provide a stable bottom for the support of the bottle.

BRIEF DESCRIPTION OF THE DRAWINGS

FIG. 3 is a side elevational view of the plastic sheet forming equipment to manufacture rolls of the oriented thermoplastic material.

FIG. 4 is a partial plan view, related to FIG. 3, illustrating the side margin trim of the sheet forming a predetermined web.

FIG. 7 is a side elevational view of a portion of the sleeve forming machine which processes the strips or rolls into individual blanks of predetermined length.

FIG. 8 is a plan view taken along line 8—8 on FIG. 7.

FIG. 9 is a partial side elevational view of the turret machine for wrapping the blanks into cylindrical, sleeve form.

DESCRIPTION

Figure 1:
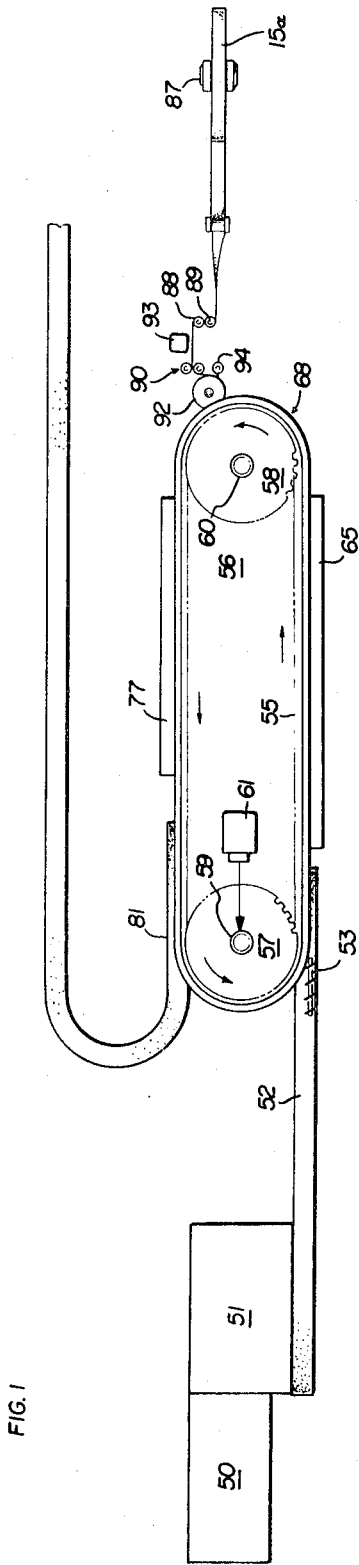
FIG. 1 is a top plan view of the invention illustrating the "off-line" embodiment, wherein bottles are loaded to the machine at room temperature and pre-heated in the machine to condition them for the processing and application of the plastic sleeves.

The process is illustrated by the drawings, referring first to FIGS. 3 and 4. An extruder 10 is operated to extrude a foamable thermoplastic material, such as polystyrene. This is but one example of a foamable thermoplastic material that may be utilized in the process, the description of the operation being given for illustration purposes, but the invention is not limited to such material.

Prepared particulate polystyrene containing a foaming agent comprised of about 6-8 percent pentane and nucleators (such as ½ percent sodium bicarbonate and ½ percent citric acid) are added to extruder hopper 11. The extruder 10 has a circular die head 12 and internal mandrel (not shown). As the plastic material issues from the die of head 12, it is directed outwardly as it is cooled. The expansion of the extrusion as it cools and sets creates a particular degree of cross direction orientation T of the extrusion in a radial direction. The degree of cooling of the plastic as it issues from the die head and is expanded (stretched) radially is also controlled so as to set up a differential in the skin layer between the outside and inside surfaces of the extrusion. It has been found that superior results are obtained by having a substantially heavier (deeper) skin on the surface of the tubular extrusion that is to be adjacent the bottle than on the opposite surface of the tube. In the case of the foamed polystyrene material above stated, this ratio should be 1.2 to 1 or more. The extruder issues the enlarged (stretched) tubular form of plastic 13 which is slit at opposite diametrical sides by a razor-like slitter 14 forming an upper web 15 and lower web 15' of the plastic. In the web form, the cross direction orientation of the plastic material is represented by the arrows at T. Spaced from extruder die 12 is an S-wrap stand 17 having upper set of rolls 18 and 19 rotatably mounted thereon. A nip roll 20 operates in conjunction with roll 19. Web 15 is reeved about rolls 18 and 19 and over a guide roll 21. At the gauge stand 22 is a gauge monitor device 23 that measures gauge or thickness of the material as a control function of extruder operation. Web 15 then passes guide rolls 24, 25, 26 and 27 and on to the roll guide 28. Web 15 next passes over feed roll 29 of top web winder 30. The pull or torque applied by web winder 30 is controlled to impart a stretch or pull to the extruded material issuing from die head 12. This pull sets an orientation M of the plastic longitudinally of the plastic web. This procedure places an orientation characteristic in the plastic web 15 in the machine direction M which is then wound as a roll 31 in the winder apparatus 30.

As the web 15 is passing over feed roll 29, spaced rotary slitter knives 32 and 33 (see FIG. 4) are driven by suitable rotary power means (not shown) to trim the web of plastic to a predetermined width. The width of the web 15 will be a multiple of the height dimension the plastic sleeve blank is to have in forming the cylindrical sleeves for bottle covering.

As should be obvious, the second web 15' on the lower course is treated in identical fashion. The parts performing the identical function are thus numbered with the "prime" designation after the number to distinguish between the counterpart at the top course of the web handling mechanism. After slitting to width, the plastic web 15' is wound into a roll 31'. In reeving the plastic into rolls 31 and 31', the outer surface of the extrusion from the die becomes the outer facing surface of the roll. Rolls 31 and 31' are thus identical.

Figure 5:
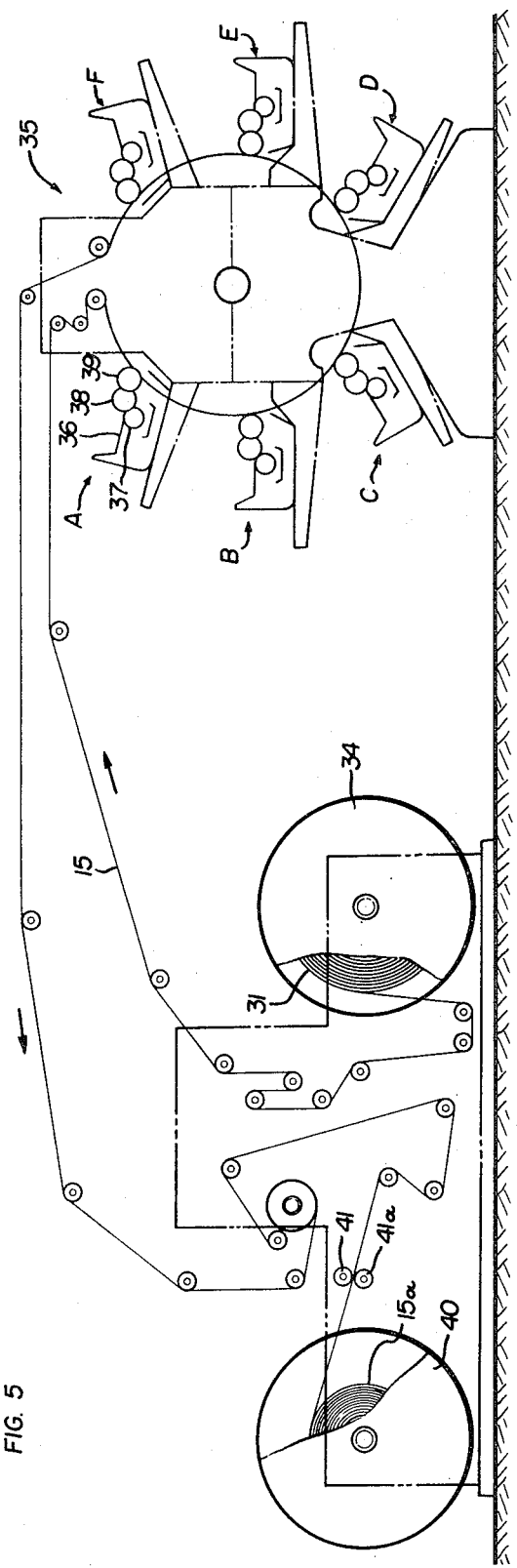
FIG. 5 is a side elevational view of the thermoplastic web undergoing multicolor printing or decorating in an offset printing press.

Next, referring to FIG. 5, the rolls of plastic 31 or 31' are transferred to a printer whereat a multicolor decoration, label or whatever is desired, is printed on the flat surface of the plastic web. The roll 31 is mounted on the unwind stand 34 and the web is reeved over the several rolls in the direction of the arrows for tensioning and feeding the web into the multicolor printing press 35. As was mentioned earlier, one surface of the plastic has a thinner skin depth than the opposite surface skin. In loading the rolls to the printing press, the surface with the thinner skin is the outside surface of the sleeve to be made ultimately; and, therefore, this surface is the one printed with the decorative image.

The press illustrated is an offset rotary letter press capable of high quality printing on the sheet form of web 15 through the succession of heads A–F arranged about the main drum of the press. Each head, such as A, includes the inker 36, having an inking roll 37, feed roll 38 and offset roll 39 for printing a particular component or color of the decoration repeatedly onto the moving plastic web 15. The print is repeated endlessly over a length equal to the circumference dimension of a blank to be cut from the web at a later step in the process. Across the width of web 15 the images may be separated in multiples to comprise plural duplicate widths of the decoration on a dimension equal to the height of the sleeves that are ultimately formed at the next step after printing.

Along the length of the web 15 are printed several indicia marks. The space between these marks (which may be a dot or a fine transverse line) is equal to the length dimension of a sleeve blank. The single decoration pattern for the sleeve is printed between two adjacent indicia.

Figure 6:
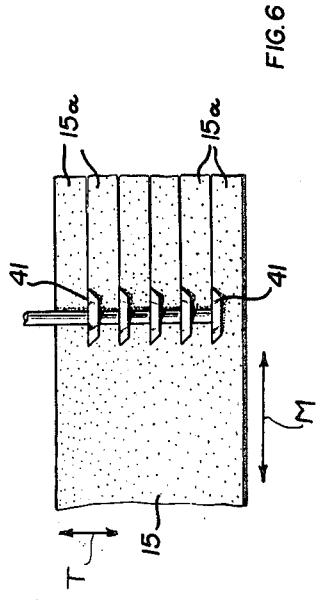
FIG. 6 is a partial plan view showing the cutting of the printed thermoplastic web into definite width strips or rolls.

As web 15 leaves the press 35, the ink is cured in the span of travel over the several rolls to the rewind drum 40. Just before the web enters the rewind drum, a series of rotary slitter knives 41 and 41a (FIG. 6) cut the web into a series of equal width, side-by-side strips, each numbered 15a. The width dimension of the strips 15a is selected to equal the height dimension for the sleeves to be subsequently formed therefrom. As the web 15, now separated into separate strips 15a, is wound onto rewind drum 40, several individual rolls of printed strip stock of the specially oriented plastic material are on the drum. These may be separately removed and handled as stock for making the sleeves in the process according to a manner to be presently described.

Figure 2:
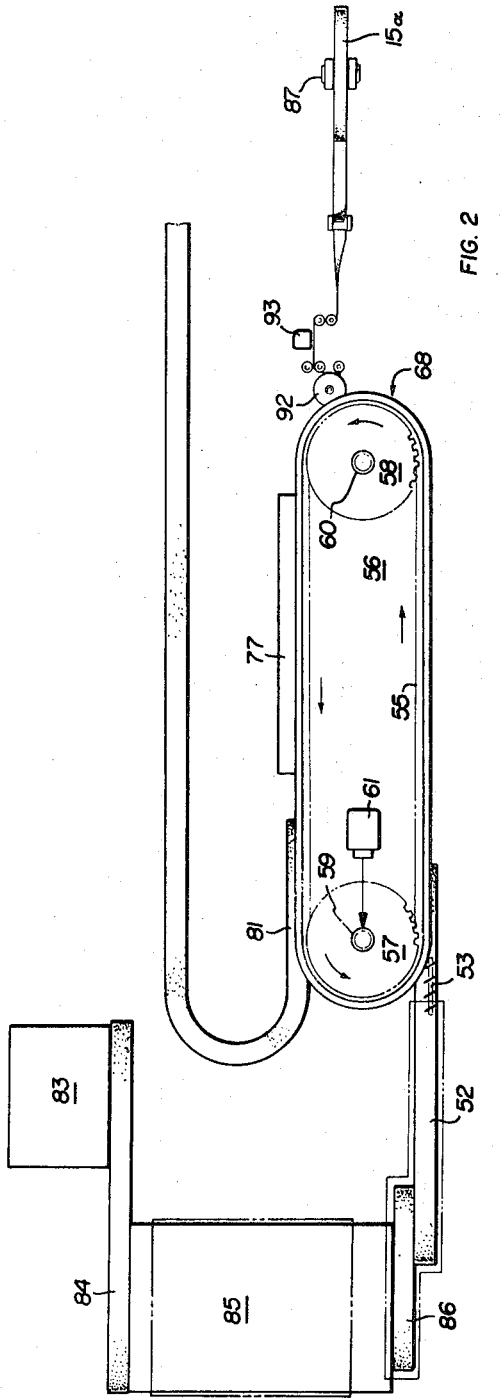
FIG. 2 is a top plan view of the invention like FIG. 1, but illustrating a second embodiment, herein called the "on-line" embodiment, wherein glass bottles are delivered from the annealing lehr of the bottle manufacturing line at an elevated temperature and loaded to the machine for applying the plastic sleeves, this latent heat of manufacture being utilized in the glass bottle at the time the plastic sleeve is first telescopically applied.

As seen on FIGS. 1 and 2, the process of this invention may be practiced by either of two embodiments.

OFF-LINE EMBODIMENT — FIG. 1

Figures 19, 20:
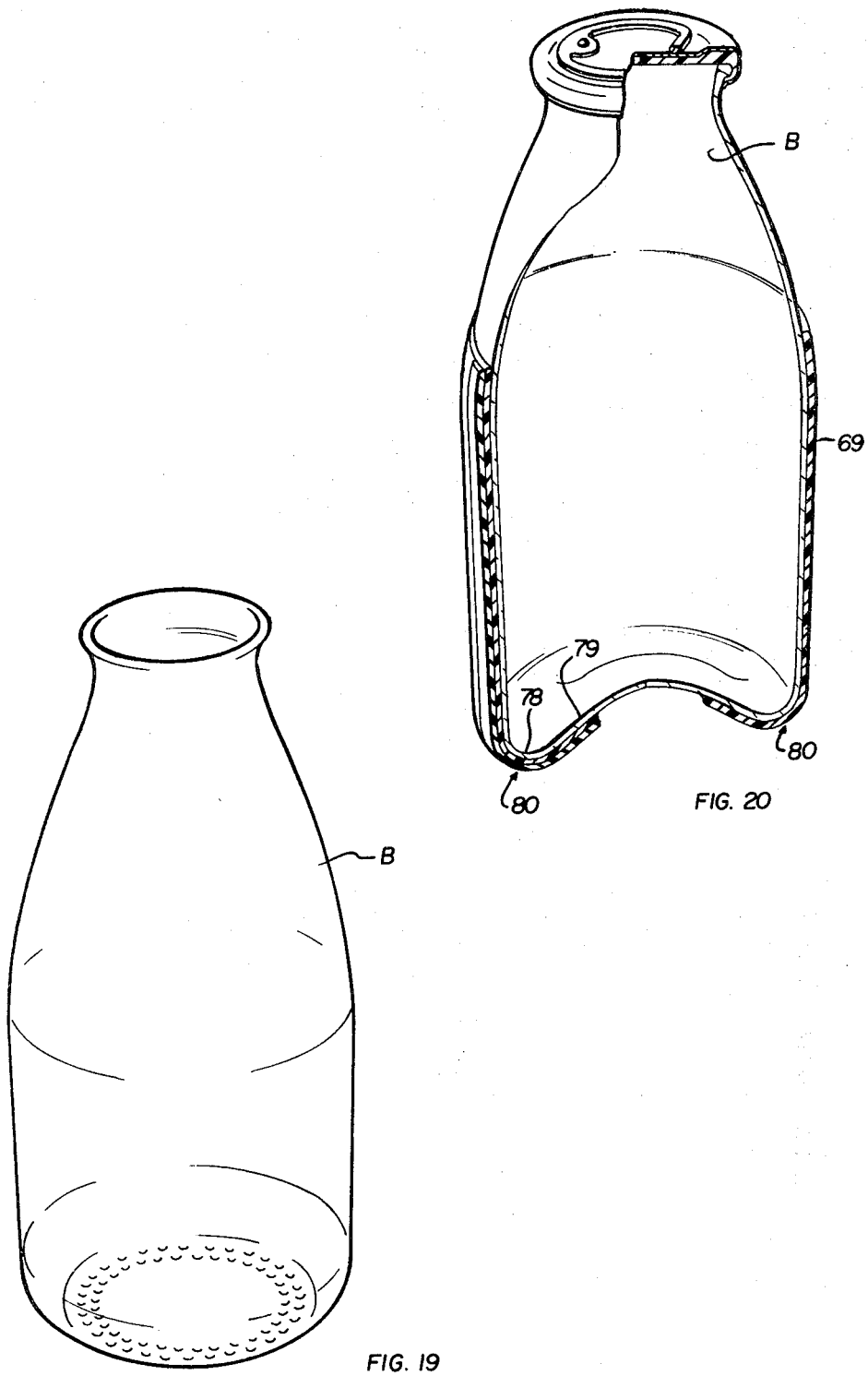
FIG. 19 is a perspective view of a glass bottle prior to its being covered with the plastic sleeve.
FIG. 20 is a sectional perspective view of a bottle produced by the present invention showing the snugly fitting, shrunken plastic sleeve covering and includes a closure as the bottle would be utilized to package a product.

The "off-line" embodiment, as called herein, involves the process wherein glass bottles are first manufactured and handled in the normal fashion. The bottles are collected and transported, or stored, and then transported to an area such as a depalletizer unit 50 whereat they are fed through a conventional unscrambler unit 51 and moved in a line or lines onto infeed conveyor 52. Conveyor 52 advances the glass bottles B (see FIG. 19) into the infeed timing worm 53 which spaces the bottles B and times them under linearly spaced chucks 54 of the bottle handling conveyor (see FIG. 12). Chucks 54 are connected at equally spaced intervals on a carriage chain 55 of the bottle handling machine 56 that is traveling in a path extending about end turns at the end sprockets 57 and 58 supported by their vertical shafts 59 and 60 respectively on machine 56. The shaft 59 is connected to a suitable conventional drive transmission or gear box (represented by arrow on FIG. 1) which is in turn operated by a drive motor 61. Carriage 55 for the bottle chucks 54 is driven in a counter-clockwise direction about the endless conveyor path defined by machine sprockets 57 and 58.

Figure 12:
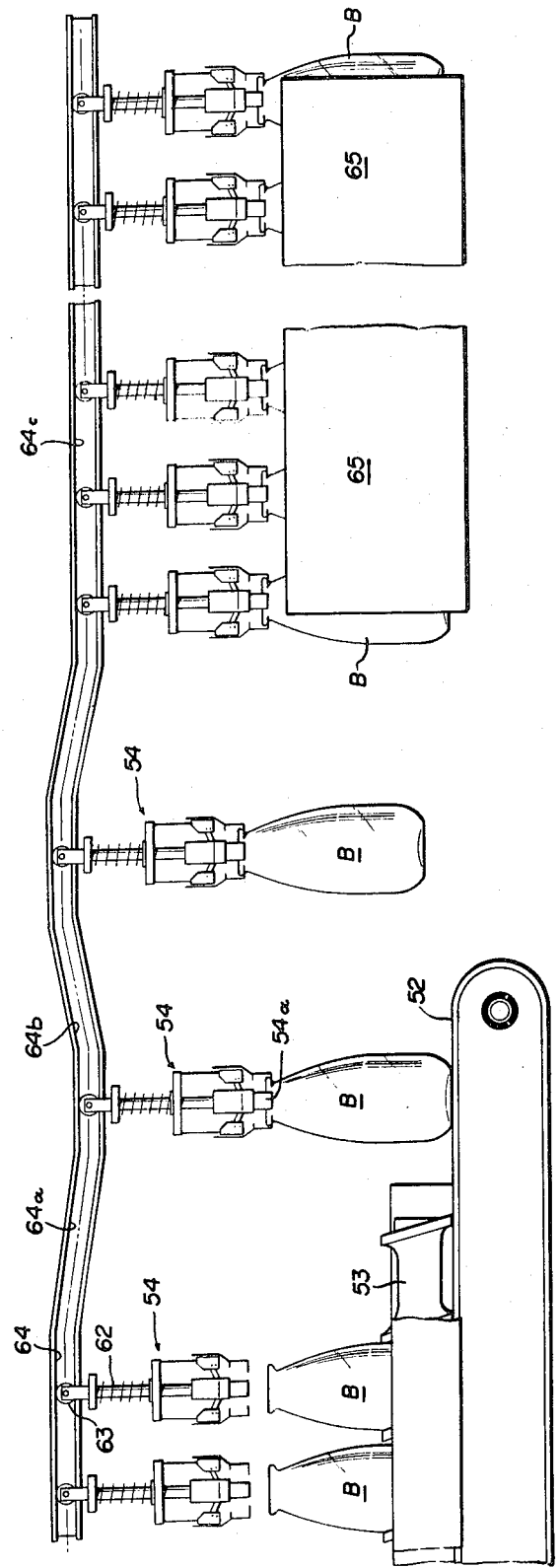
FIG. 12 is a partial side elevational view of the bottle handling machine including the pre-conditioning section for an "off-line" embodiment of the invention.

Referring to FIG. 12, chucks 54 are manipulated in vertical elevation by having their center spindle 62 connected to a roller-follower 63 running in a cam track 64 extending about the path of the carriage 55 on machine 56. As the bottles B are released at the end flight or land of timing worm 53, the axis of bottle B is timed in movement with the center of a chuck 54. The downwardly sloped section 64a of the cam track both lowers the chuck 54 and closes its jaws 54a about the top bead or rim F of the bottle finish grasping the bottle in the chuck for carrying it with movement of the carriage 55 in the path prescribed thereby. After grasping the bottle, cam section 64b raises and lifts the chuck and bottle from the conveyor 52.

In this, the "off-line" embodiment of the invention, the bottles B are conditioned thermally by moving them through the heat tunnel 65 containing a source of heat, such as circulating hot air.

An important feature of the process is having bottles B at elevated temperature of at least 175°F (or near the melting point temperature of the plastic material) at the time the plastic sleeve is applied. The tunnel preheat oven will preheat the bottles carried by chucks 54 to a temperature in the range of 175°–300°F. For example, using the expanded or foamed polystyrene plastic mentioned earlier, it is preferable the glass of bottles B have a wall temperature on the order of 220°F. This aids in control over the contour of the shrunken sleeve. The preheat temperature of the glass will vary depending on the character of the plastic used for the sleeves, i.e., the composition and thickness.

After bottles B emerge from tunnel 65 at elevated temperature, they are carried in a circular path around an end turn at gear 58 and axially aligned vertically over mandrels 66 (FIG. 9). Mandrels 66 are spaced equally around the turret 67 of sleeve forming machine 68. The turret 67 is driven by a differential transmission (not shown) connected to the vertical shaft 60 of the bottle handling machine which is in turn connected to gearing on turret 67. Thus, the turret 67 is synchronized to move with the carrier 55 and mandrels 66 on turret 67 may be advanced or retarded with respect to the centers of the chuck 54 on carrier 55 by the differential transmission.

Figures 14, 15:
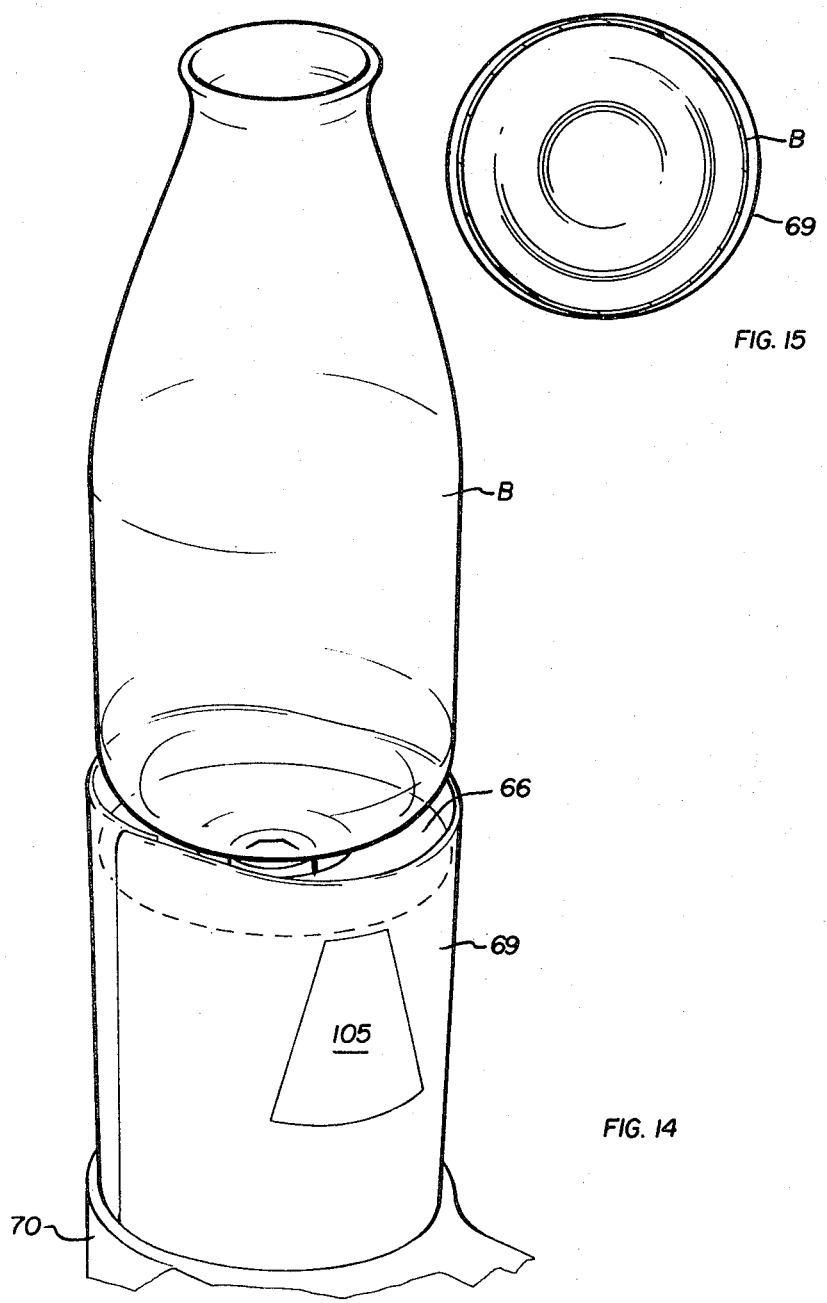
FIG. 14 is a perspective view of the bottle as carried over the mandrel for inserting the sleeve over the bottle.
FIG. 15 is a sectional top plan view of the bottle and sleeve taken through the major body of the bottle.

As the bottles B travel in overlying registered fashion with mandrels 66 (see FIG. 21), the plastic sleeves 69 thereon are raised and inserted telescopically over the lower end of the bottles. This is accomplished in the "ejection cycle" portion of the machine 68 as follows. Referring to FIG. 14, the relationship of bottle B and sleeve 69 is illustrated at the beginning of the ejection cycle. A stripper sleeve 70 is journaled over mandrel 66 and when raised, sleeve 70 shifts plastic sleeve 69 vertically from mandrel 66 and onto bottle B (see FIG. 16). The vertical movement of plastic sleeve 69 is controlled by cam roller 71 (FIG. 9) rotatably mounted on rod 72 by shaft 73. Roller 71 runs on lower cam 74 attached in stationary relationship to the rotary turret 67. The rising segment 74a of the cam elevates rod 72 and stripper 70 to the proper height for sleeve 69 over the bottle body (see FIG. 16). Cam 74 then recedes and stripper 70 is lowered again to the lowermost, inactive position. As represented on FIG. 21, stripper 70 will operate through one reciprocal raising and lowering cycle during each revolution of machine turret 67.

Sleeve 69 is dimensioned by mandrel 66 to be just slightly larger than the body diameter of bottle B. The heat of bottle B initiates slight shrinkage of the plastic sleeve and this combined with the "egg-shaping" of the sleeve 69 after stripping it from the mandrel will hold the sleeve in place on the bottle for the next step of the process.

The plastic sleeve 69 is seamed by heat and pressure applied through the hot seamer 75, one seamer 75 being supplied on turret 67 radially inwardly and opposite each mandrel 66. Seamer 75 has a forward bar-like surface 76 shifted radially outwardly into contact with overlapping end portions of the plastic material for sleeve 69 wrapped around mandrel 77. Bar 76 is heated by internal electrical resistance heater means (not shown). The joining of the ends of the plastic provides an axial seam of sleeve 69. As seen on FIG. 15, after sleeve 69 is released from the mandrel 66, this discontinuity in the sheet of plastic by forming the axially directed seam creates the tendency for the sleeve to assume a somewhat "egg shape" and thereby frictionally engage the overhead bottle to assist holding sleeve 69 in place. Looking at FIG. 21, the sleeve 69 is placed on and carried by the bottle B from about the 10 o'clock position on turret 67 to about the 6 o'clock position whereat the path of the carrier for the bottle chucks diverges tangentially. Looking at FIG. 1, this tangential position occurs at about the 12 o'clock position on that Figure.

Figure 18:
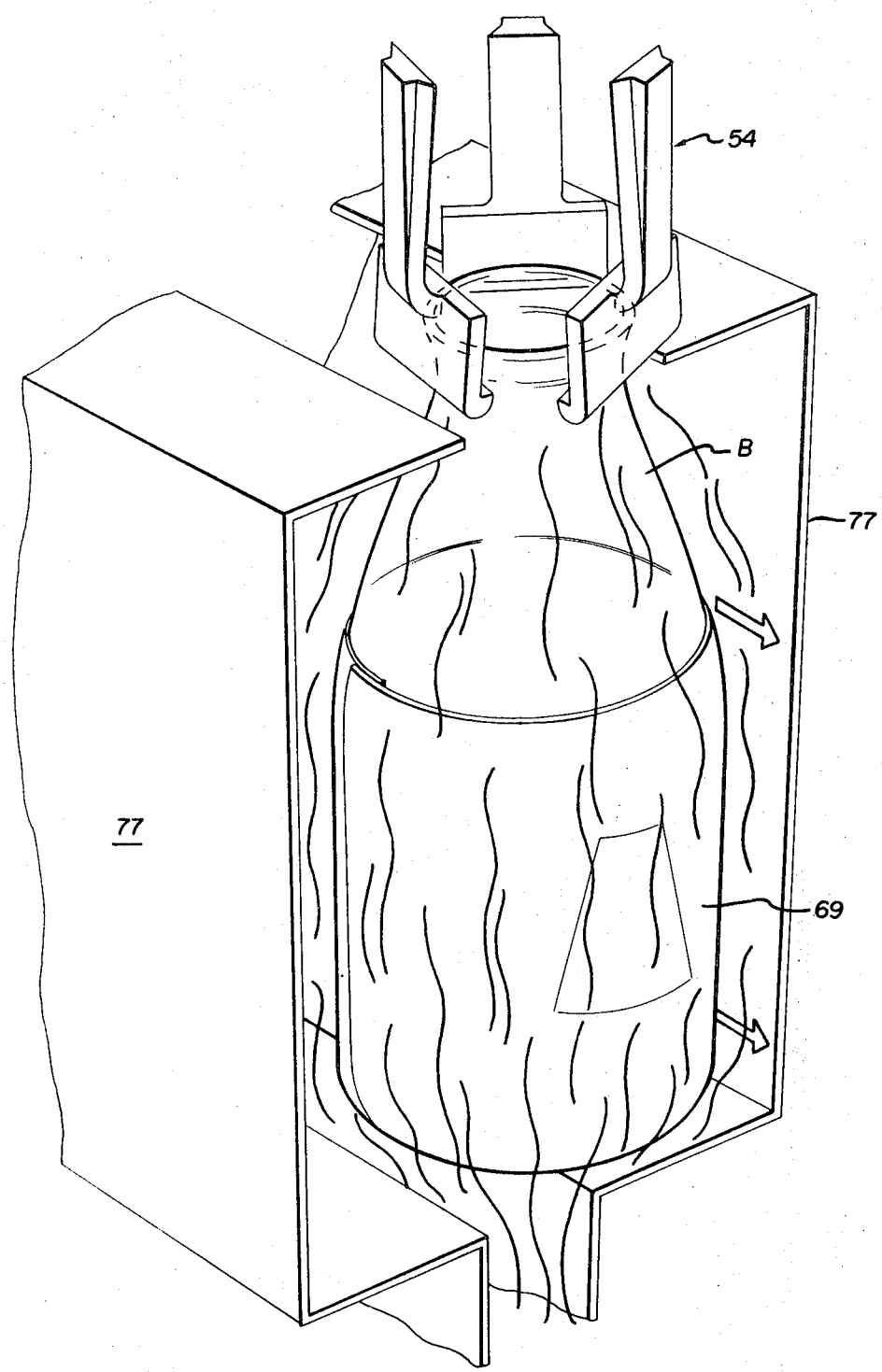
FIG. 18 is a perspective view, broken away, of the bottle and sleeve in the heat oven of the machine.

The carrier 55 next traverses the length of tunnel 77 which is an elongated oven chamber heated to a temperature for shrinking the sleeve 69 onto the contours of bottle B in a snug fitting relationship. This step is illustrated on FIG. 18 which portrays the bottle and plastic sleeve shrunken thereon while in the oven tunnel 77.

The oven chamber 77 is constructed to receive heated air circulated vertically for movement over the bottles as they are moved longitudinally of the chamber. The air temperature may vary widely depending upon the composition of plastic being used, its thickness in the sleeve and the time available in the tunnel for completing the shrink of the sleeve onto the bottle.

In the case of foamed polystyrene of about 0.050 inch thickness and a residence time in the tunnel of from 4 to 6 seconds, heated circulated air at approximately 400°F will shrink the plastic sleeve suitably into conforming snug fit onto the bottle. The residence time in the chamber 77 will be a function of production rate; however, at a rate of say 150 pieces per minute the tunnel need not be unusually long to obtain a 4–6 second heating step.

As a variable, polyethylene used in making sleeve 69 requires a higher temperature of oven and more time. Most shrinkable thermoplastics that are practical and economical for making the product may be operable at reasonable production rates at oven temperature in the range of 175°–800°F. Using a hot or heated glass bottle enhances performance and obtains superior results, i.e., by having the bottle at a temperature in the range of 175°–300°F at the time the plastic sleeve is put on the bottle, depending upon the plastic material being used and the sleeve thickness.

Figure 16:
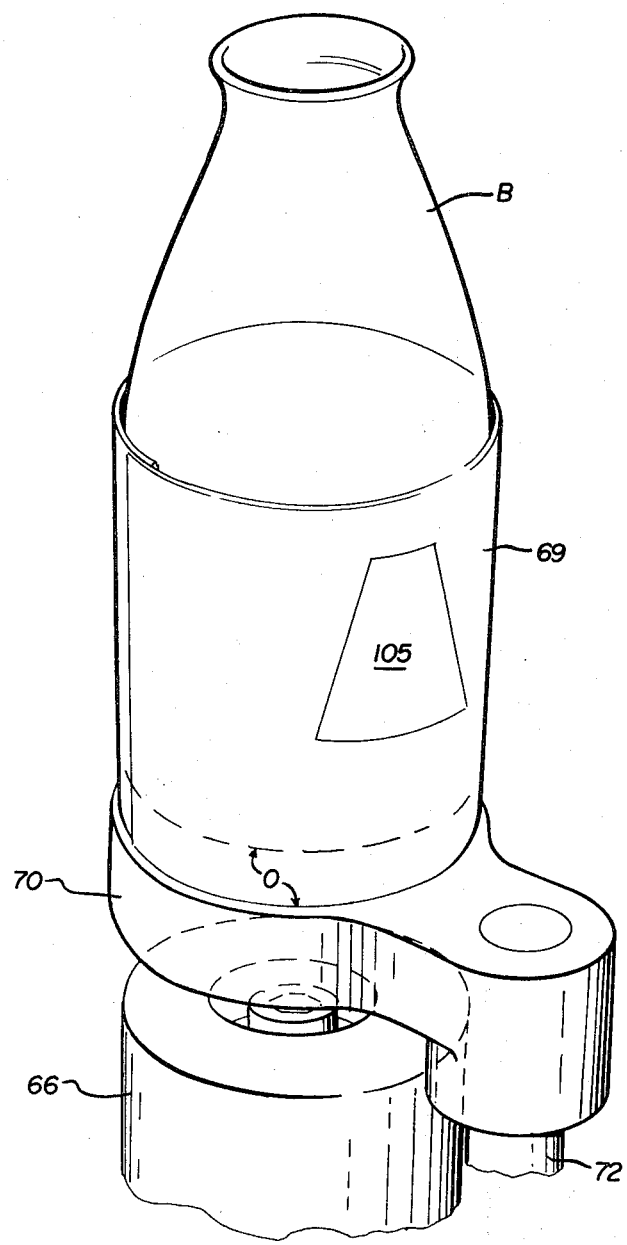
FIG. 16 is a perspective view of the bottle and sleeve inserted thereover to full height of placement.
Figure 17:
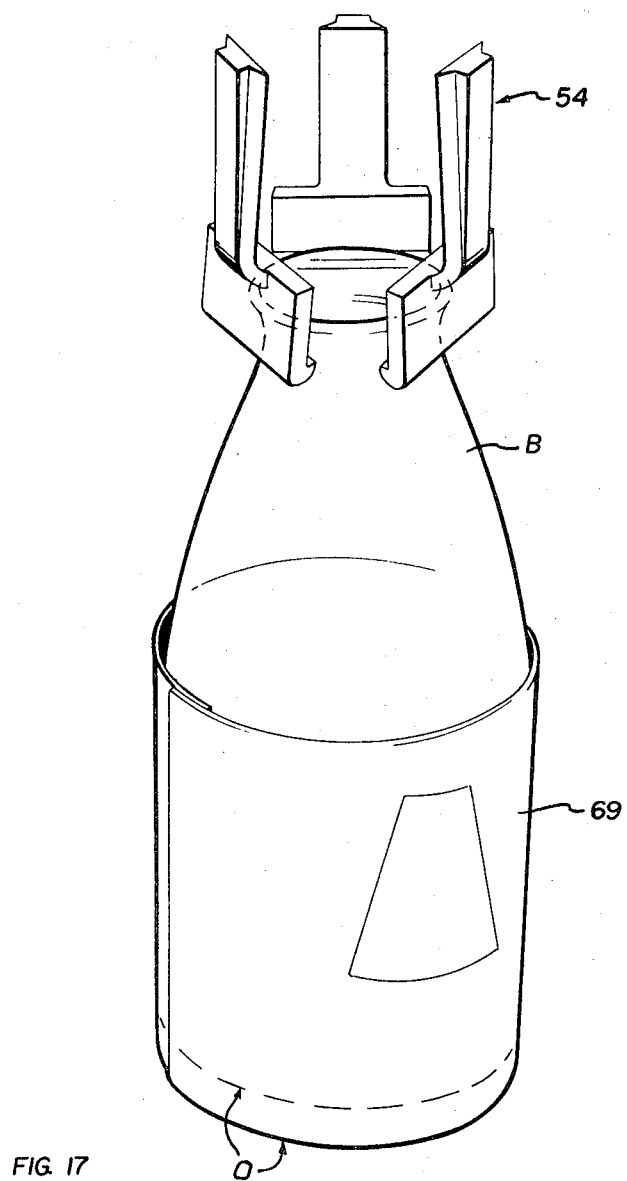
FIG. 17 is a perspective view of the bottle and sleeve thereon being transported by the bottle handling machine toward the heat oven.

In placing plastic sleeve 69 over bottle B, the bottom edge of the sleeve extends below the bottom surface of bottle B by an amount indicated as "O" (see FIGS. 16 and 17). After the sleeve is exposed to heat in tunnel 77, the lower end of the plastic sleeve shrinks around the lower end corner radius of the bottle, indicated at 78 on FIG. 20 and along the bottom surface 79 of the bottle to form the annular plastic bearing ring at 80 for supporting the plastic covered bottle B' on a level surface. The orientation of the plastic material in the cross direction T assists in the shrinkage of the sleeve around the heel corner of the bottle and snugly over the bottom bearing ring surface. Along the opposite upper end of the sleeve, this orientation factor also assures a smooth line and snug fit of the sleeve over the sloped neck portion of the bottle. The earlier described ratio of the T and M orientation factors is very material in achieving an end product in which the sleeve fits snugly and smoothly in a pleasing outline over the bottle.

Figure 13:
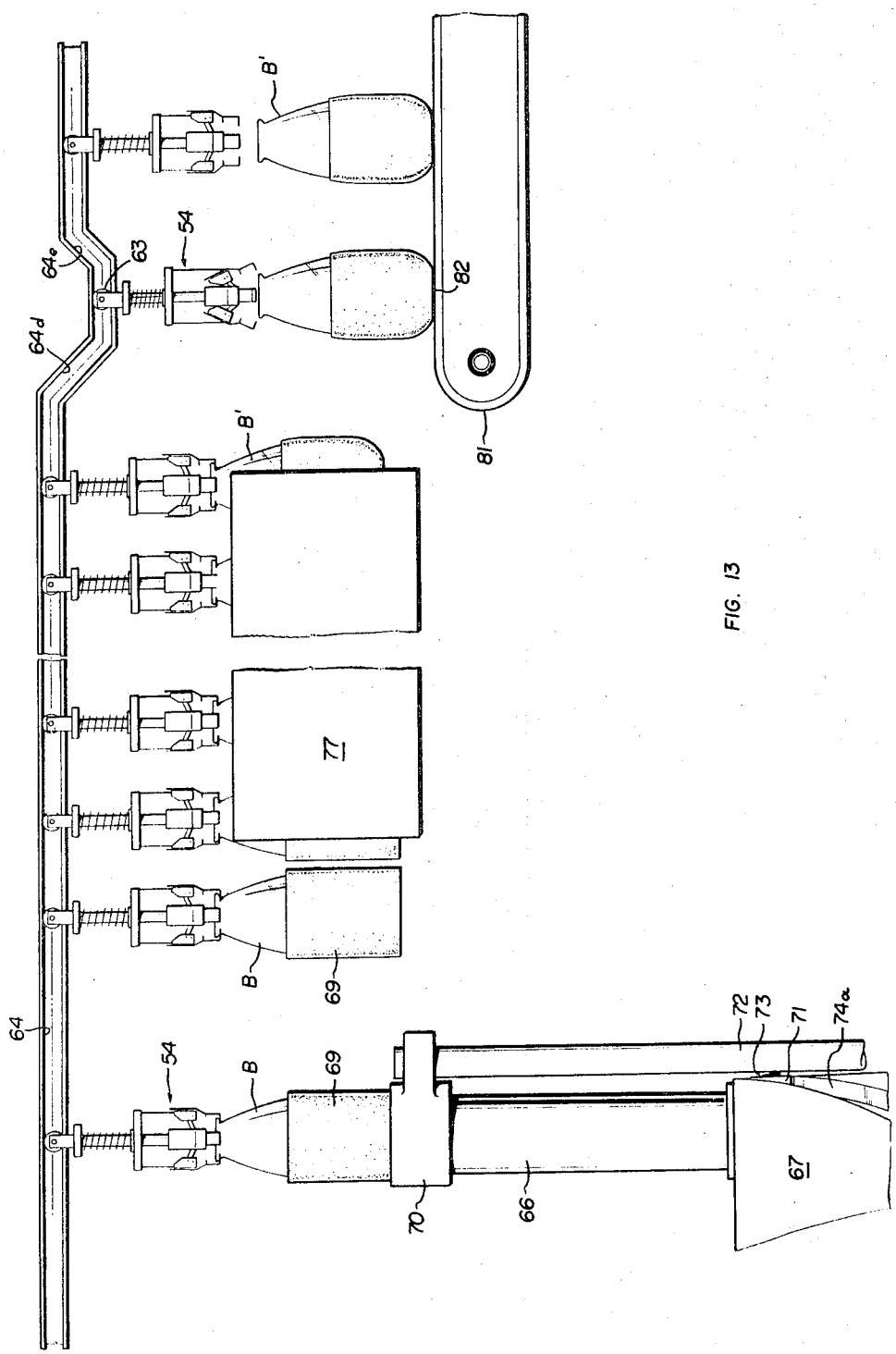
FIG. 13 is a partial side elevational view of a machine including the mandrel of the turret machine and the bottle handling machine including the heat tunnel for shrinking the plastic sleeves on the bottles and the delivery means for unloading the bottles and ironing the bottom ring surface of the shrunken plastic sleeve.

Referring again to FIG. 13, after the finishing bottles B' with shrunken plastic covering thereon emerge from oven 77, the machine carriage 55 conveys them toward the unloading conveyor 81. The chuck assembly rollers 63 follow a downwardly inclined segment 64d of the cam track which abruptly lowers the bottle onto a firm and flat upper surface section 82 of conveyor 81. This bumps the bottle B' on surface 82 and any resulting irregularity in the seam portion of the shrunken plastic sleeve present in the bearing ring 80 at the bottom of bottle B' will be ironed out by this force. The bearing surface at the bottom end of the bottle will then be stable, removing any irregular bumps or the like to cause the bottle to be a "rocker," i.e., unstable when resting on a horizontal support.

As shown on FIG. 1, the conveyor 81 transfers the finished bottles to a location for packing and shipment or storage. The resultant product is a glass bottle having a body wall surface, corner heel radius and annular portion of its bottom surface covered with a plastic layer that will cushion and protect the glass against abuse and impact.

ON-LINE EMBODIMENT — FIG. 2

The principal difference in the "off-line" embodiment of FIG. 1, just described, and the "on-line" embodiment of FIG. 2 resides in the supply of the hot blank or bare bottles B.

In the "on-line" embodiment, glass bottles are molded to final shape by a conventional bottle forming machine 83, such as the "I-S" Bottle Machine (individual section machine) manufactured and sold by Emhart Corporation and described, beginning at page 326, in "Handbook of Glass Manufacture," compiled and edited by F. V. Tooley, Ogden Publishing Company, New York, N. Y. second printing, 1957. Several other glass bottle making machines are described in the Handbook which may be equally applicable to the machine 83 represented on FIG. 2. The formed glassware (bottles B) are transferred by conveyor 84 to and through an annealing lehr 85. Lehr 85 is conventionally designed to operate so that glassware is received at temperatures around 800°–1,000°F from forming at machine 83. In the forward section of the lehr, the bottles are increased in temperature to above their strain point — which will vary for different glass compositions — generally for a soda-lime bottle glass this anneal point is on the order of 1,085°–1,100°F. Thereafter, the bottles are cooled in a controlled gradual manner to about ambient or handling temperature. However, in the present anneal cycle for the present invention, the lehr 85 will be operated or constructed to discharge its ware to a conveyor at a temperature suitable for the hot bottle introduction into the machine 56. Allowing for cooling in transfer, the bottles may leave lehr 85 at around 400°F and be further cooled in the process to the desired 200°–200°F at the time the bottles and plastic sleeves are joined at the machine 68. Removal from lehr 85 will proceed through an unloading device 86 and be placed onto the machine conveyor 52. While in a line on conveyor 52, the infeed worm 53 will load the now hot bottles B onto the carriage 55 by the chucks 54. The preheater structure (see 65 in FIG. 1) may or may not be used. A section of preheat structure 65 may be a useful means of controlling the cooling of the bottles on their way to the assembly with the plastic sleeve. In any event, the distinguishing saving in the "on-line" embodiment is first the use of latent heat of manufacture of the bottles as the initial heat in the "hot bottles" for the process; and, secondly, the extra handling of the ware after annealing, such as packaging, palletizing, storage and the like, is avoided, thereby saving on production costs.

SLEEVE MAKING MACHINE

The machine 68 for making the plastic sleeves 69 has already been described generally in the foregoing. A more vivid description follows with reference to FIGS. 7–9 and 21.

Figure 21:
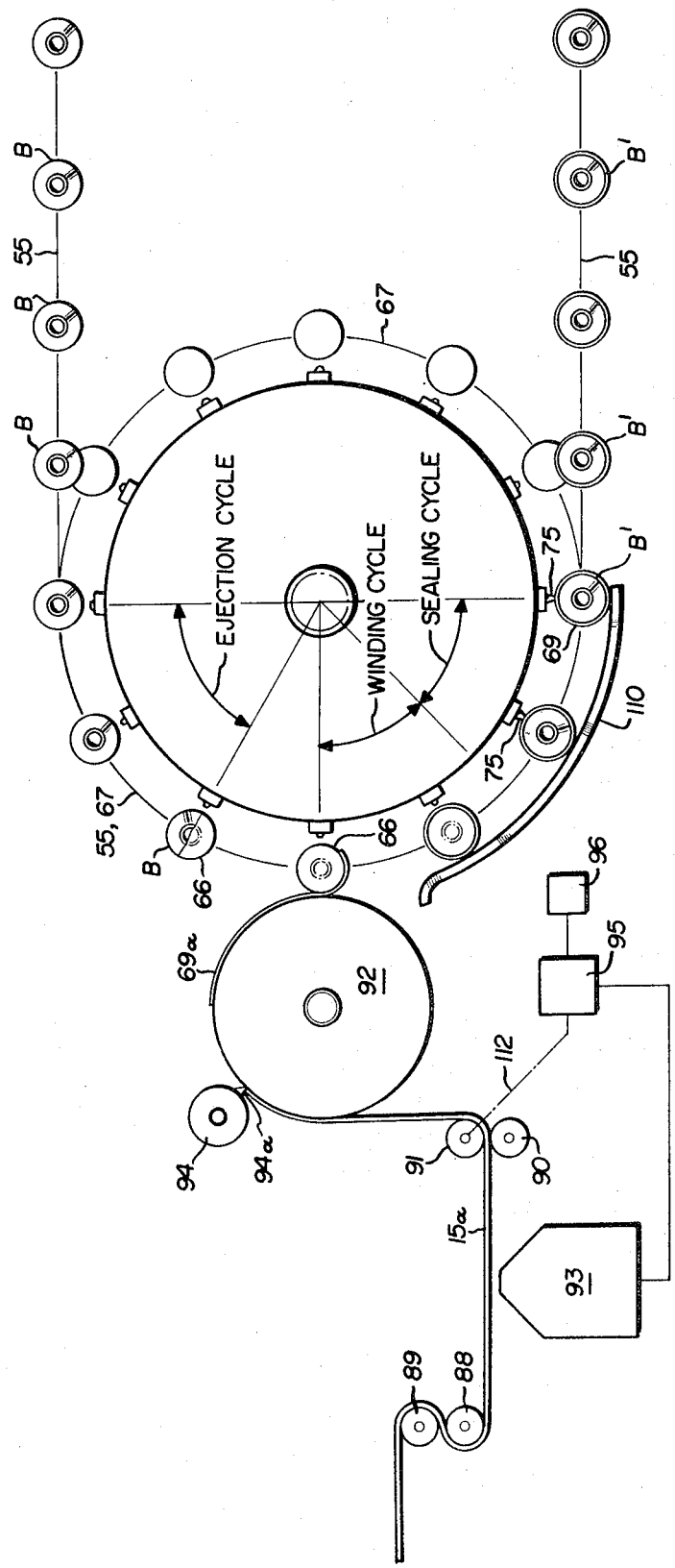
FIG. 21 is a schematic plan view of the machine for sizing, wrapping, seaming and assembling the plastic sleeves onto the bottles.

The plastic strip stock is supplied in rolls 15a (FIG. 1) which are supported on rotary stand 87 with the decorated surface facing either direction. A twist is placed in the roll stock before the S-wrap guide 88, 89 so that the decorated surface faces outwardly as the strip passes over roll 89. As the strip stock is fed through S-wrap guide 88, 89, the strip of plastic is advanced in a vertical position. As best shown on FIGS. 7, 8 and 21, the strip next passes between the pair of feed rollers 90, 91 and onto the feed drum 92. The strip goes onto feed drum 92 with the printed side facing outwardly on that drum. Between S-wrap 88, 89 and the pair of rollers 90, 91 is a photocell registration unit 93 that maintains the linear relationship of the repetitive decoration in the strip relative to the rotary cut-off knife 94. Referring to FIGS. 7, 8 and 21, the continuous pull of the feed rollers 90, 91 controls movement of the strip onto feed drum 92. Rollers 90, 91 are continuously driven from a drive connection 112 through a differential mechanism 95 powered by an electric motor 96.

After the strip passes through feed rollers 90, 91 the leading portion of the strip is held against the vertical cylindrical face of the feed drum 92 by vacuum applied through the vertically arranged series of ports 97 (FIG. 7). Vacuum is applied through a top manifold (not shown) being in mesh with a bull gear on the turret 67 drive. The rotary knife has a rotary shaft 99 that is gear connected to the gearing for feed drum 92. The relative peripheral size of feed drum 92 and rotary knife 94 are of a ratio of at least 3 to 1, and for every revolution of feed drum 92, rotary knife 94 makes three revolutions so that the vertical blade 94a thereon cuts three lengths of plastic from the strip. Drum 92 has a peripheral speed slightly faster than the feed rolls 90, 91 move the strip. With the vaccum on the strip, it is carried to the knife 94a with a small amount of slippage on drum 92. This keeps strip 15a taught, but after the cut is made by knife 94a, the trailing edge of the cut strip accelerates from the front edge of the next blank and the successive cut blanks are thereby spaced apart in series. The periphery of drum 92 is in close tangential proximity to the peripheral surface of mandrels 66 as they are moved past the drum by the rotary turret 67. The clearance between mandrel 66's surface and feed drum 92's surface is about 1½ times the thickness of the strip 15a. When, during rotation of turret 67, the center axis of the mandrel 66 coincides with the diametrical line connection between the rotary centers of the turret 67 and drum 92, the cut strip of plastic, now defined by dimension as the sleeve blank 69a, is transferred from the feed drum onto the mandrel 66.

Figure 10:
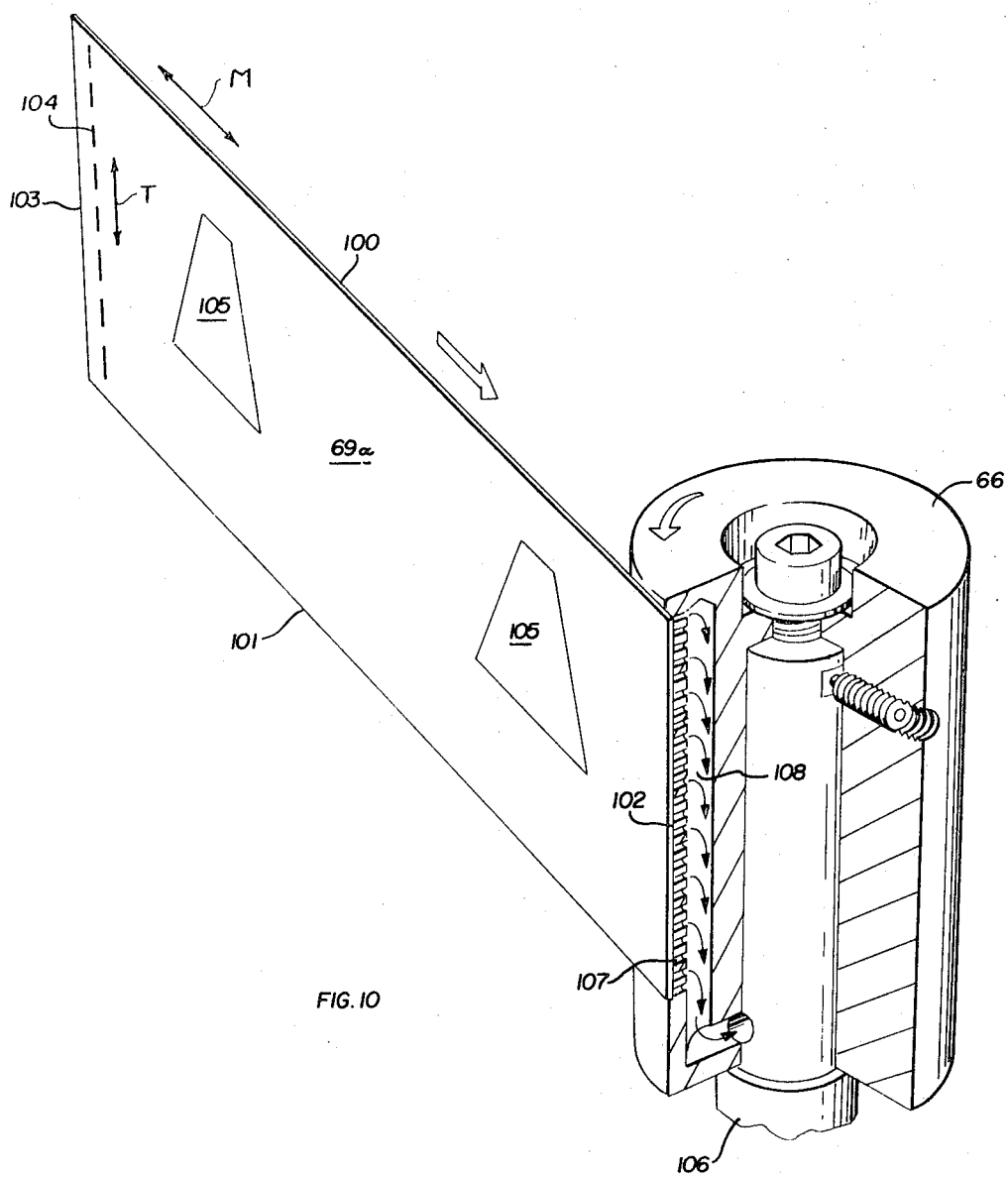
FIG. 10 is a perspective view of the mandrel of the machine of FIG. 9.

This transfer attachment of blank 69a is spatially and schematically illustrated on FIG. 10. Mandrel 66 is rotatably mounted on the turret by the hollow vertical rotary shaft 106 which controls the rotation of the mandrel about its own axis. Along the periphery of the mandrel are several vertically arranged vacuum ports 107 receiving vacuum through the internal chamber 108. A connection is made to a vacuum source through the central passage of shaft 106 and the radial port 109 connected into chamber 108. Although only one row of vacuum ports 107 is shown, several rows may be utilized. As the leading edge 102 of sleeve blank 69a covers the ports 107 of the mandrel, the blank will be held on the mandrel. At this point, the mandrel is at the beginning of the winding cycle of turret rotation, and through gearing connected to the shaft 106 (not shown) in the turret, mandrel 66 is rotated counterclockwise (FIG. 21) 540°, or 1½ revolutions in the winding cycle. The blank 69a is wrapped on the mandrel and the trailing edge 103 of the blank overlaps the leading edge 102 to the dashed line reference 104 (FIG. 10). During the rotation of the mandrel in its winding cycle, the plastic blank 69a is held against the mandrel by the stationary winding plate 110 which is supported on the frame 111 of the strip feed machine (FIGS. 7 and 21). Adjustable pressure of winding plate 110 maintains a tight wrap of the plastic strip on the mandrel.

Figure 11:
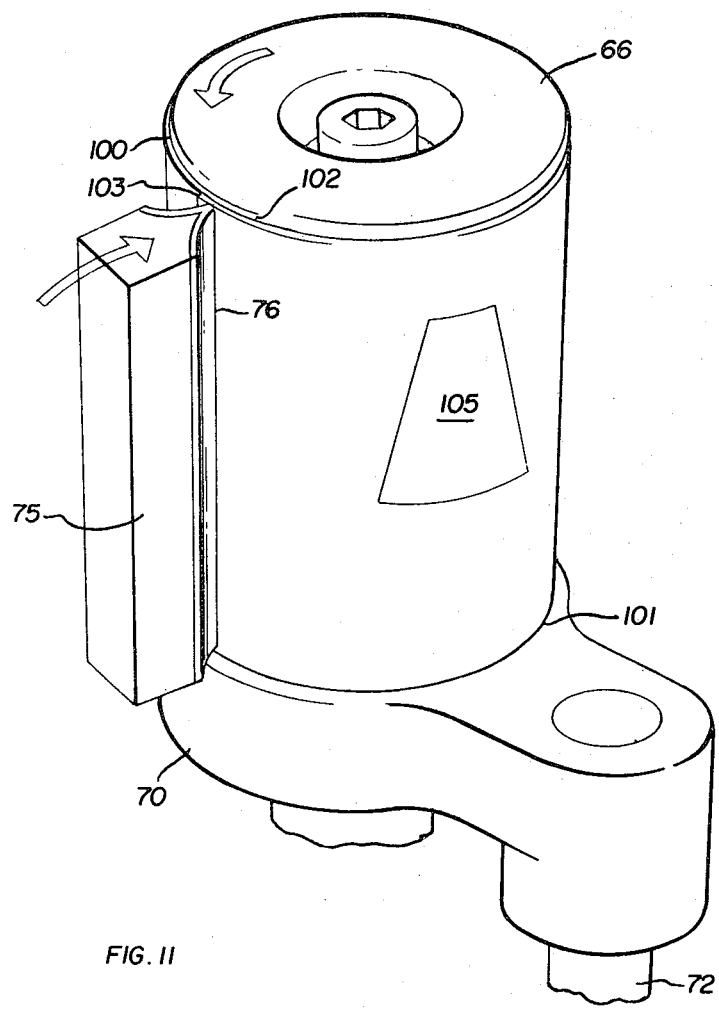
FIG. 11 is a perspective view of the sleeve wrapping mandrel and the seamer device.

The individual sealing bars 75 for each mandrel are located on the radius of the turret intersecting the mandrel center axis, and 540° rotation of mandrel 66 places the overlapped ends of the plastic opposite the sealing bar (see FIG. 11). After the winding cycle, the next segment of turret operation performs the sealing cycle in which the sealing bar 75 is extended to engage its heated tip 76 on the overlap seam area to apply heat and pressure, thereby seaming a cylindrical sleeve 69 on the mandrel (see FIG. 9).

Referring to FIG. 10, the inner circumference of sleeve 69 is defined by the mandrel circumference and the height of sleeve 69 was earlier determined in cutting the strip establishing the top edge 100 and opposite, bottom edge 101. The sleeve will, in the example described earlier herein, bear a decoration represented by the area 105.

After the sealing cycle is completed, sealing bar 75 is retracted radially of the turret and the formed sleeve is in position for delivery to a base article, the bottle B. Heated bottle B will approach an overlying tangent point with the arc of travel of mandrel 66 and sleeve 69 at about the 12 o'clock position on FIG. 21. As was earlier described, the bottle carrier 55 and turret 67 are synchronized so that at the 12 o'clock position, the sleeve 69 will be in underlying axial registry with bottle B. Both elements, 69 and B, hereafter travel in a common radius arcuate path and are at zero relative velocity to each other. The ejection cycle is then performed in which stripper sleeve 70 is raised until plastic sleeve 69 is placed telescopically over the bottle to the relationship shown on FIG. 16, whereupon stripper 70 is lowered to make mandrel 66 ready for the next revolution of the turret past feed drum 92. Prior to the next winding cycle, mandrel 66 is reversedly rotated 540° such that the vacuum ports are opposite feed drum 92 at the tangent point for strip transfer. Meantime, the assembled sleeve and bottle continue through the arcuate travel and eventually forward into the heat tunnel, whereat the sleeve is shrunken into snug fit over the bottle, as earlier described.

The invention is disclosed in connection with manufacture of a glass bottle; however, many advantages of the invention may be realized on combining the plastic sleeve with containers or bottles made of other materials.

The plastic material used in the process for making the sleeves may vary widely with the class of thermoplastic materials that are foamed or non-foamed. The plastic must be oriented along the circumferential dimension of the sleeve to be made, as earlier described in detail, and thickness of material selected to best suit the purpose of the bottle covering and design contemplated.

Some practical examples of thickness of plastic strip are: (1) for foamed material a preferred thickness is in the range of 0.01 to 0.10 inches; and (2) for non-foamed material a preferred thickness is in the range of 0.0025 to 0.007 inches.

Examples of suitable thermoplastics are copolymers of carboxylic acid containing monomers with ethylene (sold under the trade name "Surlyn"), medium or low density polyethylene, polypropylene, polystyrene, and polyvinyl chloride, to name a few of the available thermoplastics.

Other and further modifications may be resorted to without departing from the spirit and scope of the appended claims.

What is claimed:

1. The method comprising the steps of extruding a thermoplastic material in a longitudinal direction, forming the extrusion into flat sheet form extending in said longitudinal direction, applying longitudinal tension to said sheet form in the direction of extrusion to stretch the thermoplastic material and highly orient it in said longitudinal direction, trimming the stretched sheet to a predetermined width dimension, printing one surface of the sheet with a decoration, cutting the printed sheet longitudinally into plural strips such that their transverse dimension is equal to the height of a tubular sleeve to be formed therefrom, accumulating the individual strips in lengths for use in making said sleeves, cutting said strips individually into successive lengths to form flat sleeve blanks having a length slightly in excess of the circumference of a mandrel, wrapping the blank lengthwise around the mandrel so that the opposite ends overlap, seaming the overlapped portions of the blank on the mandrel to form a tubular sleeve, and stripping the tubular sleeve axially off of the mandrel.

2. The method defined in claim 1, wherein said printing step includes printing indicia on each strip spaced lengthwise thereof at intervals corresponding to a sleeve blank length, orienting the sleeve blank lengths between successive indicia, and cutting the oriented strips to sleeve blank lengths, thereby registering the decoration in the successive blanks cut from said strip.

3. The method of making shrinkable thermoplastic sleeve-like members comprising feeding a rolled length of shrinkable thermoplastic material having a predetermined width equal to the height dimension of said sleeve member onto a feed drum, holding the strip of said drum by vacuum, cutting successive sleeve blank lengths of the strip on said feed drum, moving the leading edge of each cut length into engagement with a mandrel, holding the leading edge of the blank length on the mandrel by vacuum and releasing the vacuum hold on the cut strip by said feed drum, wrapping the blank length on the mandrel by rotating the latter, the mandrel being of lesser circumference than the length of said blank, thereby overlapping the ends of said blank, connecting the overlapped ends to each other to form a seamed sleeve, and stripping the sleeve axially from the mandrel.

4. The method defined in claim 3, wherein the overlapped ends of said wrapped sleeve blank are connected by moving a heated elongated member into contact with the overlapped thermoplastic and disposed along the height thereof, and applying pressure by said member radially inwardly on said mandrel.

5. The method defined in claim 4, wherein the leading edge of the blank length is moved into engagement with the mandrel and the mandrel is rotated one and one-half revolutions in wrapping the blank length thereon, the heated elongated member being disposed to one side of the mandrel diametrically opposite the location whereat the blank length engages the mandrel.

* * * * *